Patented Dec. 23, 1941

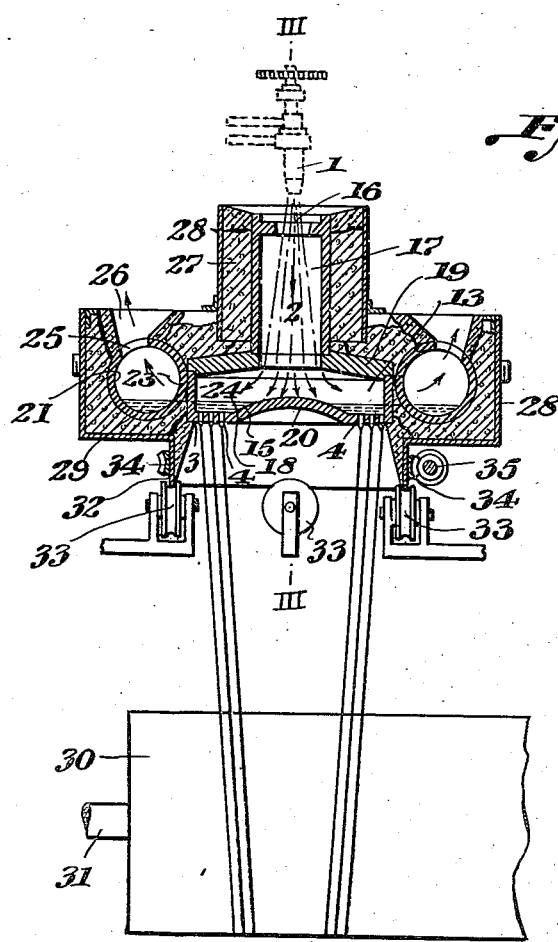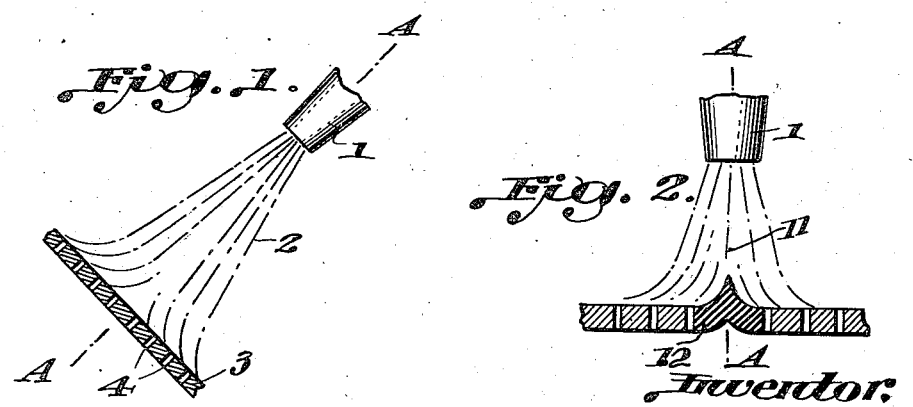

2,267,019

UNITED STATES PATENT OFFICE 2,267,019

APPARATUS FOR THE PRODUCTION OF GLASS THREADS

Wilhelm Esser, Bergedorf, Germany, assignor to the firm Oscar Gossler Glasgespinst-Fabrik Gesellschaft mit beschränkter Haftung, Bergedorf, Germany Application October 15, 1937, Serial No. 169,315
In Germany November 21, 1936

3 Claims. (Cl. 49—55)

The invention relates to apparatus for the production of glass threads by melting glass in a container equipped with outlet apertures and heated with a liquid or gaseous heating agent.

It has already been proposed to produce glass threads by heating the glass in a container and allowing the molten material to emerge from outlet apertures at the bottom either by mechanical drawing or spontaneously under the action of gravity. It has also been proposed to heat the furnace electrically or by means of liquid or gaseous fuels, and in the latter case the flame has simply been directed on to the liquid glass. It has been found that the glass remote from the outlet apertures is heated to a higher temperature than the glass near the outlet apertures and that moreover the glass is subjected to the high temperature for too long and is devitrified, while the thermal value of the fuel is not adequately utilised.

These disadvantages are avoided by the present invention, which relates to apparatus for the production of glass threads by fusing glass in a container provided with outlet apertures and heated by means of liquid or gaseous fuel, the feature of the invention being that the heating flames or heating gases are directed towards the apertured plate. Preferably the spinning nozzles constituted by the apertures are so arranged in the plate that they are located in flame zones of approximately equal temperature. Suitably the nozzles are arranged concentrically with respect to the axis of the flame. According to a preferred embodiment the flames or heating gases are directed approximately at right-angles to the apertured plate. It would also be possible to direct a plurality of flames against the apertured plate.

According to a preferred embodiment of the present invention a deflecting body is arranged approximately at the centre of the apertured plate so as to guide the flame in such a way that the centre of the flame which has a lower temperature coincides with the surface of this deflecting body. Preferably the thickness of the deflecting body is about equal to the thickness of the apertured plate and preferably the deflecting body is interchangeably arranged in the apertured plate.

The furnace according to the present invention preferably has the form of a body of rotation with the flame axis as directrix and internally has suitably the form of a cylindrical shaft.

Near the point where the flame enters, the furnace of fire-proof material is constructed in the form of a shaft and near the point where the heating gas emerges is furnished with a preheating or fusion chamber for the glass. Preferably the fusion chamber is at a higher level than the clarification and/or spinning chamber, so that the glass can flow under the action of gravity in the opposite direction to the flow of the heating gas.

The furnace according to the present invention is preferably rotated and/or moved relatively to the flame. Suitably the furnace is moved simultaneously with respect to the spinning drum, e. g. is moved to and fro laterally.

According to one embodiment of the invention the flames or the heating gases are directed in counter-current to the flow of the glass first of all into the vicinity of the outlet openings for the liquid glass, then are utilised for the clarification of the molten glass, then for the fusion of the glass, and finally for preheating the glass.

The invention will now be described more fully by way of example with reference to the accompanying drawing, in which:

Fig. 1 shows diagrammatically the direction of the flame against the apertured plate in accordance with the present invention.

Fig. 2 is a vertical longitudinal section through an embodiment similar to Fig. 1 with a deflecting body arranged in the centre of the apertured plate on the centre line of the flame.

Fig. 3 shows a vertical longitudinal section through a furnace according to the present invention.

The essence of the present invention resides in that the flame 2 emerging from the nozzle 1, e. g. a gas flame, an oil flame or the like, is directed against the apertured plate 3 with the apertures 4 along the line A—A which is about at right-angles to the plate as shown in Fig. 1. The molten glass, which is not shown in Fig. 1, is disposed above the plate 3 and emerges through the apertures 4 in the form of drops which in known manner are drawn out into fine threads by winding on drums or the like.

In the present invention, as the flame is directed at right-angles against a surface such as the apertured plate 3 as shown in Fig. 1, the heat is utilised not longitudinally of the flame but transversely to the axis thereof and due to the impact of the flame on the surface 3 the heat is concentrated in a small space in the plane of the apertures 4. It has been found that it is possible in this way to effect a very considerable economy in fuel and that for example with the same number of apertures and with about the same dimensions of the furnace only one-fifth of the heating oil otherwise necessary is consumed when the heating is effected in accordance with the present invention.

It is known that in the interior of the flame 2 there is a centre core constituting a colder zone approximately at the point indicated by the reference 11 in Fig. 2, so that it is advisable to provide on the apertured plate 3 on the axis A—A of the flame a so-called deflecting body 12 to deflect the flame laterally. The surface of the body 12 may be of streamlined configuration. It is however sufficient if it is slightly arched towards the flame. Preferably the deflecting body 12 is so constructed that it has approximately the same thickness as the plate 3, as otherwise stresses which might cause fracture may arise between plate 3 and deflecting body 12 if there are fluctuations in temperature. It is particularly advantageous to make the deflecting body 12 interchangeable so that it can readily be replaced if fracture should occur.

A preferred embodiment of the present invention is illustrated in Fig. 3.

The container 13 in which the glass is fused in the furnace according to the invention is produced in known manner from a fireproof material such as chamotte. The flame enters at 16 through a shaft-like portion 17 forming a vertical channel or shaft, through which the flame 2 from the nozzle 1 is introduced in a vertically downward direction so that the flame is incident first of all in the chamber 18 on that part of the container provided with the spinning openings 4, i. e. the apertured plate 3. The chamber 18 is charged with molten glass which has the appropriate temperature for spinning. This chamber 18 above the spinning nozzles or outlet apertures 4 is called the spinning chamber 18. As seen from the drawing, the spinning chamber 18 is comparatively flat or dish-shaped. It is provided with a removable cover 19 and the central portion 20 of the apertured plate 3 is arched towards the flame. At the centre of the flame this arched portion constitutes a deflecting body 20 similar to the deflecting body 12 in Fig. 2.

Arranged concentrically with respect to the axis of the flame about the deflecting surface 20 are the spinning nozzles 4, for example in five concentric circles in such a way that they all lie in zones of approximately equal temperature in the flame.

Disposed laterally of the spinning chamber 18 are the fusion or clarification chambers 21 which are each connected with the spinning chamber 18 by two openings 23. Preferably the connecting channels 23 are so high that the lower edge 24 constitutes a ledge keeping back unfused glass so that the fusion space 21 constitutes a prechamber for the clarification of the molten glass and unmolten fragments of glass or impurities are retained. If necessary a screen or the like may be incorporated to remove all impurities.

The fusion chamber 21, which may have any suitable form, is provided at the top with an opening 25 which expands into a charging hopper 26 through which the charge of glass is introduced. The heating gases after giving up their main quantity of heat in the spinning chamber 18 and heating the glass 15 to the spinning temperature, pass through the connecting channel 23 into the fusion and clarification chamber 21 in counter-current to the flow of glass and finally emerge through the charging opening 26 of the fusion chamber 21.

Three fusion and clarification chambers 21 could, for example, be arranged around the spinning chamber 18 but naturally this number can be varied as desired and depends upon the particular arrangement employed and, if desired, a complete annular fusion and clarification chamber can be disposed around the spinning chamber 18. As seen from the drawing, the heating channel 17 above the spinning chamber 18 and the fusion container 21 may be surrounded with insulating material 27 and be protected by enclosure in a sheet metal housing 28.

The furnace can be rotated about the longitudinal axis III—III. Also the burner 1 can be rotated simultaneously in the direction of rotation of the furnace or in the opposite direction and with the same or different speed.

Provided beneath the furnace is a spinning drum 30 of known construction which turns about a shaft 31. The threads emerging from the spinning apertures 4 are secured on this drum 30 and are wound up thereon by its rotation. The spinning drum may have a movement relative to the furnace in that the furnace performs a lateral movement to and fro in addition to the rotary movement, or else the spinning drum 30 itself is moved laterally.

This rotary movement may be accomplished by means of a shaft 35 which rotates a worm gear which latter is in mesh with the gear 34 on the housing 28. The lower edges of the housing 28 rests on rollers 33 on which it rotates.

The mode of operation of the fusion device according to the present invention is as follows:

The fusion chamber 21 is charged through the opening 26 with the cullet or frit of suitable composition. Thereupon a flame produced from a suitable liquid or gaseous fuel is directed into the shaft or channel 17 from the nozzle 1. The flame passes through the shaft 17 into the spinning chamber 18 and encounters the plate 3. From there it is directed through the connecting channel 23 in counter-current to the flow of glass into the fusion or clarification space 21, heats the glass 29 introduced into the fusion chamber 21 to fusion temperature and fuses it, so that the excess fused glass can flow over the ledge 24 into the spinning chamber 18. Here the glass comes into contact with the hotter heating gases and is heated to the requisite spinning temperature of, for example, 1500° C. which permits a satisfactory spinning, the emergence from the spinning apertures under the action of gravity and the production of a satisfactory thread.

By directing the heating gases in counter-current to the flow of the glass the temperature of the glass constantly increases from the point where it is introduced to the point at which it emerges because during its passage through the furnace the glass encounters progressively hotter gases. In this way, in accordance with the known counter-current principle, a utilisation of heat which is satisfactory from the point of view of heat technology is obtained. It has been found that this arrangement complies to a high extent with the practical requirements and it is surprising that the use of the counter-current principle affords increased technical advantages for the present case contrary to the opinion which has previously obtained, namely that there must be a temperature drop from the point where the glass is introduced to the point where it emerges.

The container can have any suitable form. Instead of being in the form of a tall shaft, it may have a low compact form, e. g. cylindrical or spherical. Also flames could be introduced into a horizontal cylinder from both sides or from a number of directions and could be led out again separately or together.

Naturally the fusion temperatures depend upon the composition of the glass. Also the dimensions of the container must be altered in accordance with the particular working conditions. The glass may emerge from the spinning apertures under the action of gravity and automatically draw a thread after it. The thread can, however, be drawn out by hand or mechanically and be brought on to a spinning drum or other moving support.

I claim:

1. An arrangement for producing glass threads, comprising a container for molten glass, an apertured plate in the bottom of said container, a deflecting body mounted centrally in said apertured plate, means for rotating the container around a flame axis, and means for directing a flame onto said plate in a direction substantially at right angles thereto with the colder core of the flame incident on said deflecting body.

2. An arrangement for producing glass threads, comprising a container for molten glass, an apertured plate in the bottom of said container, a deflecting body of substantially the same thickness as the apertured plate mounted centrally in said apertured plate, means for rotating the container around a flame axis, and means for directing a flame onto said plate in a direction substantially at right angles thereto with the colder core of the flame incident on said deflecting body.

3. An arrangement for producing glass threads, comprising a container for molten glass, an apertured plate in the bottom of said container, a deflecting body, means for interchangeably mounting said deflecting body centrally in said apertured plate, means for rotating the container around a flame axis, and means for directing a flame onto said plate in a direction substantially at right angles thereto with the colder core of the flame incident on said deflecting body.

WILHELM ESSER.